(12) United States Patent
Hsiao

(10) Patent No.: US 7,422,079 B2
(45) Date of Patent: Sep. 9, 2008

(54) INTELLIGENT OBSTACLE-OVERCOMING VEHICLE

(76) Inventor: Shih-Chi Hsiao, 2F., No. 31, Lane 212, Hulin St., Sinyl District, Taipei City 110 (TW)

( * ) Notice: Subject to any disclaimer, the term of this patent is extended or adjusted under 35 U.S.C. 154(b) by 242 days.

(21) Appl. No.: 11/363,045

(22) Filed: Feb. 28, 2006

(65) Prior Publication Data

US 2007/0199743 A1     Aug. 30, 2007

(51) Int. Cl.
   *B60K 1/00*     (2006.01)
(52) U.S. Cl. ............... 180/65.1; 180/65.5; 180/907
(58) Field of Classification Search ........... 180/65.1, 180/907; 280/5.2, 5.28, 5.32, DIG. 10; 301/5.23
   See application file for complete search history.

(56) References Cited

U.S. PATENT DOCUMENTS

| | | | | |
|---|---|---|---|---|
| 4,823,900 A | * | 4/1989 | Farnam | 180/6.5 |
| 5,833,248 A | * | 11/1998 | Eguchi | 280/5.28 |
| 6,571,892 B2 | * | 6/2003 | Kamen et al. | 180/8.2 |
| 2005/0023052 A1 | * | 2/2005 | Beck et al. | 180/24.07 |

* cited by examiner

*Primary Examiner*—Christopher Ellis
*Assistant Examiner*—Katy Meyer
(74) *Attorney, Agent, or Firm*—Troxell Law Office, PLLC

(57) ABSTRACT

The present invention is a vehicle which has seven degrees of freedom driven by servo motors with brakes so that obstacles of transportation are overcome for a disabled and the disabled can be lifted to a height as tall as a normal person.

13 Claims, 11 Drawing Sheets

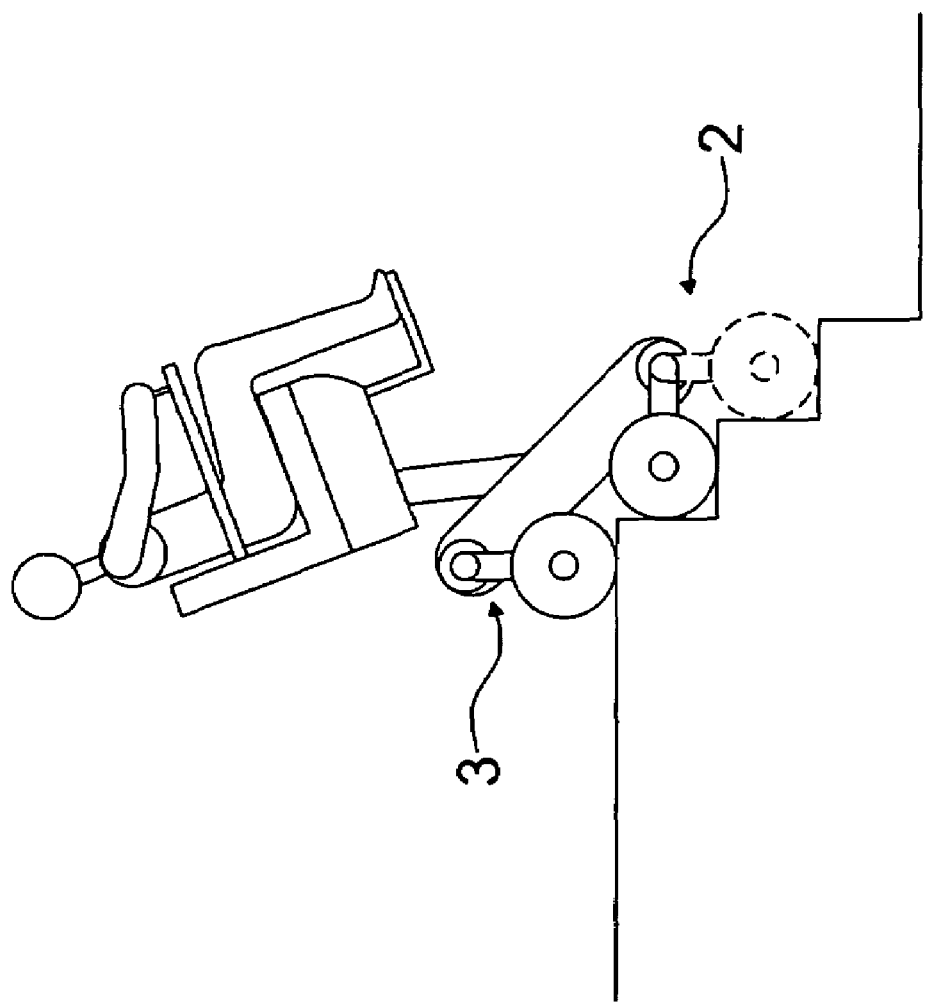

INTELLIGENT OBSTACLE-OVERCOMING VEHICLE

FIELD OF THE INVENTION

The present invention relates to a vehicle; more particularly, relates to overcoming obstacles of transportation for the disabled to position immediately and to go up or down stairs.

DESCRIPTION OF THE RELATED ART

A prior art, "A standing wheel chair", is proclaimed in Taiwan, as shown in FIG. 6, comprising two side frames 61 with wheels and a front cross rod 62 pivoted between the side frames 61; two positioning devices 63 each with a supporting stand 631 and a gear rack 632 with gear teeth; two supporting arms 64 above the side frames 61 with a rear cross rod between the supporting arms; a lifting tappet 66 geared with the gear rack 632 driving the supporting arm 64; and a motor (not shown in the figure) located between the side frames 61 to drive the lifting tappet 66, where the supporting stand 631 is connected to the side frame 61 and contains the gear rack 632.

Although the prior art can make the wheel chair stand, it is not movable while keeping standing but only moves while laid down; and it can not go up stairs. Hence, the prior art does not fulfill users' requests on actual use.

SUMMARY OF THE INVENTION

The main purpose of the present invention is to lift a disabled to the same height as a normal person, to overcome obstacles of transportation, and to change post easily.

To achieve the above purpose, the present invention is an intelligent obstacle-overcoming vehicle, comprising a main body, a pair of first wheels and a pair of second wheels, where the main body comprises a base frame, a seat and a linkage and the linkage links the base frame and the seat; the linkage has a first motor; the seat has a plurality of distance sensors under a pedal of the seat; a controlling device is deposed on a supporting arm of the seat; and the main body further comprises a horizon sensor.

Each of the first wheel set and the second wheel set has a rocker arm; the rocker arm has a shaft at an end of the rocker arm to connect to the base frame; the shaft is connected with a motor; the wheel set further has a pair of chain wheels at the same side of the rocker arm; one of the chain wheels has a spindle penetrating through the shaft; the other one the chain wheels is adhered with a wheel; the wheel is connected to the rocker arm with a wheel axle through a universal joint of the rocker arm; and, the pair of chain wheels are linked and driven with a chain. The spindle of the chain wheel of the second wheel set has a motor; and, the wheel of the first wheel set comprises a plurality of lateral moving wheels.

The present invention has seven degrees of freedom having brakes. The seven degrees of freedom are driven by servo motors having brakes to position and to put on brakes. In addition, the spindle penetrating through the rocker arm of the first wheel set is not connected with any servo motor but has a degree of freedom having a brake. Hence, the present invention has seven degrees of freedom driven by servo motors having brakes, and two degrees of freedom having brakes yet connect with no servo motor. When going up stairs by rotating the rocker arms, the wheel faces of the wheels of the first wheel set and the second wheel set are stuck to the stair surface and is prevented from sliding so that problems regarding friction of the wheel faces are diminished and the steadiness for the going up/down stairs of the main body is ensured.

Accordingly, a novel intelligent obstacle-overcoming vehicle is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is a perspective view showing a preferred embodiment according to the present invention;

FIG. 5E is a view showing a second section of going down stairs according to the preferred embodiment of the present invention;

DESCRIPTION OF THE PREFERRED EMBODIMENT

The following description of the preferred embodiment is provided to understand the features and the structures of the present invention.

Figure 1:
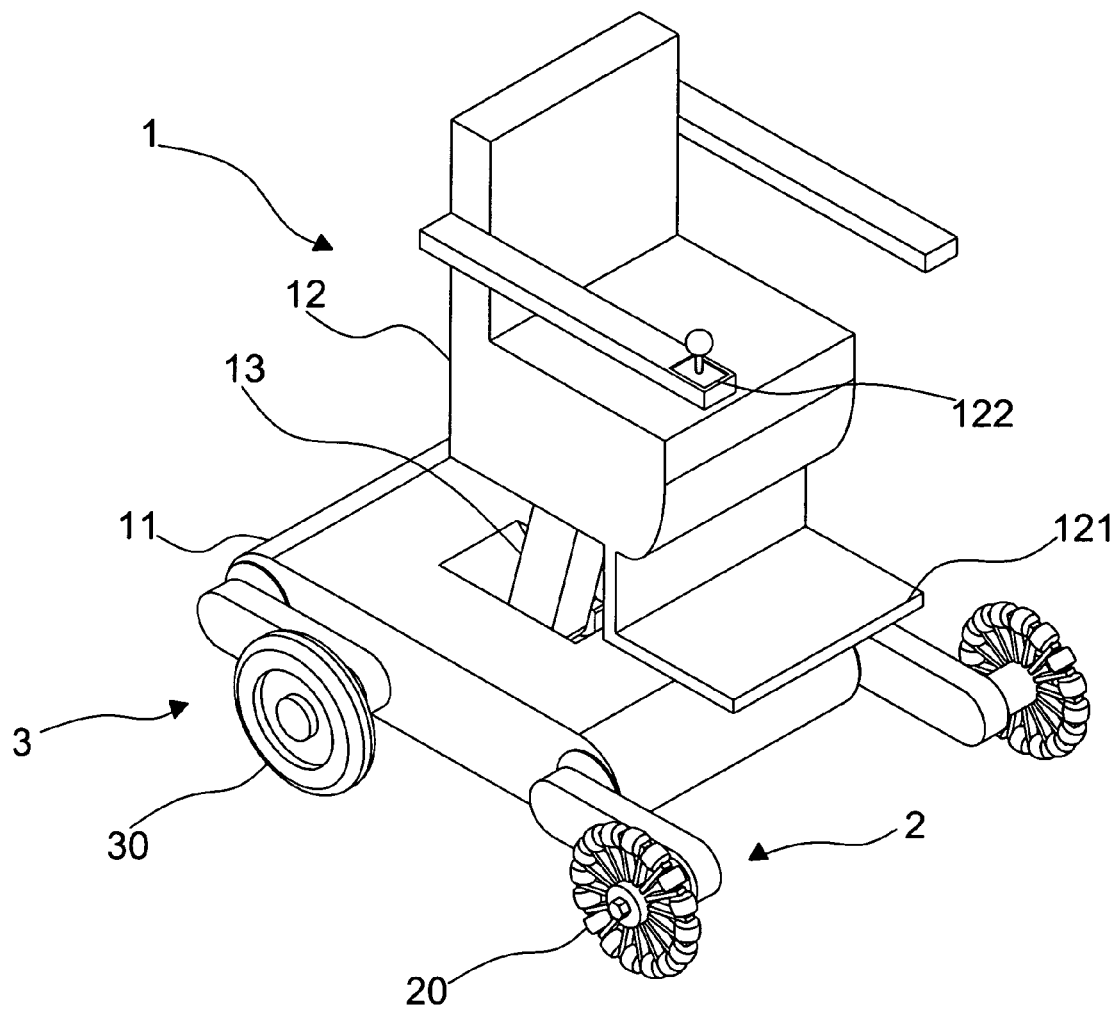
Figure 2:
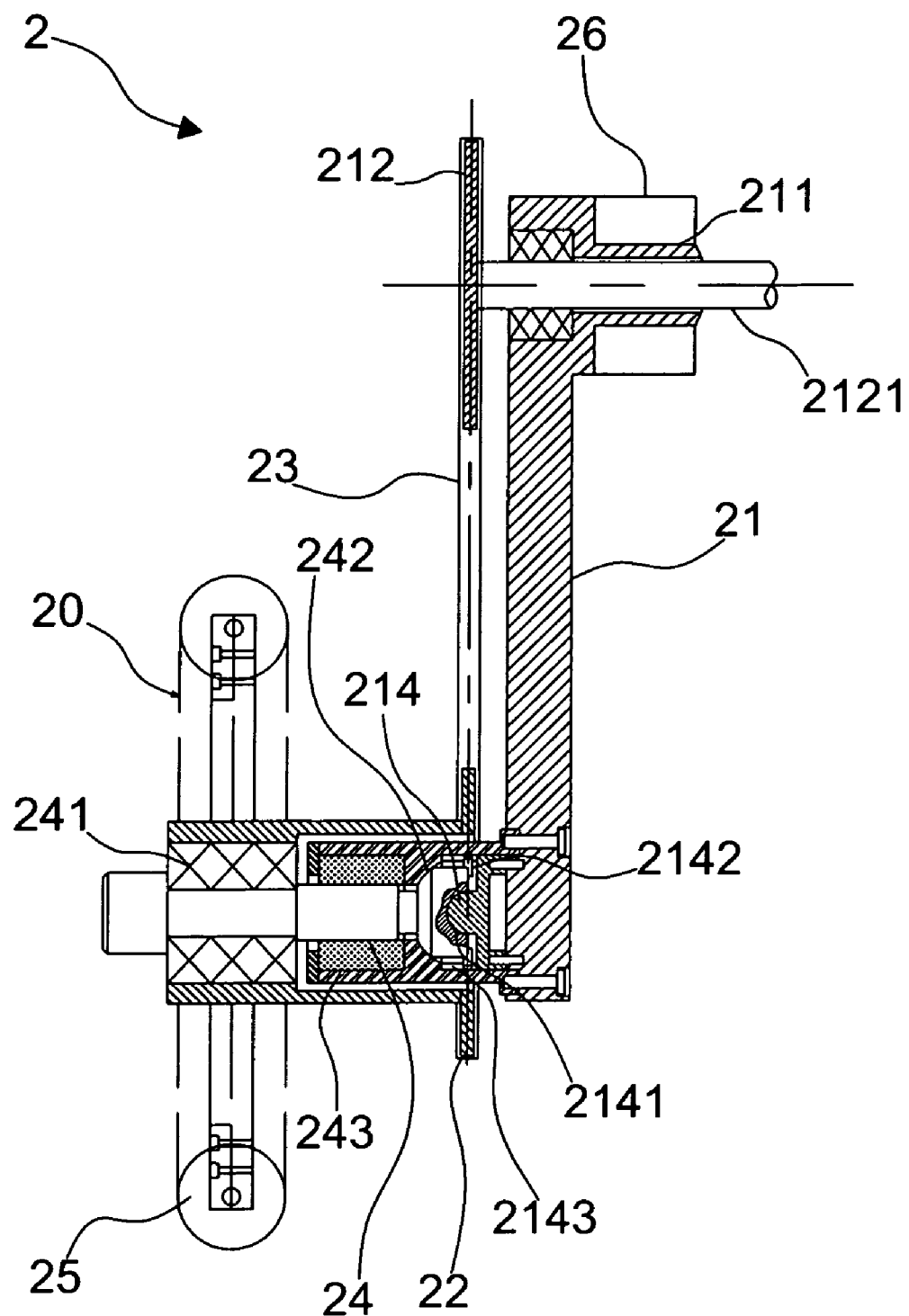
FIG. 2 is a view showing a first wheel set according to the preferred embodiment of the present invention.
Figure 3:
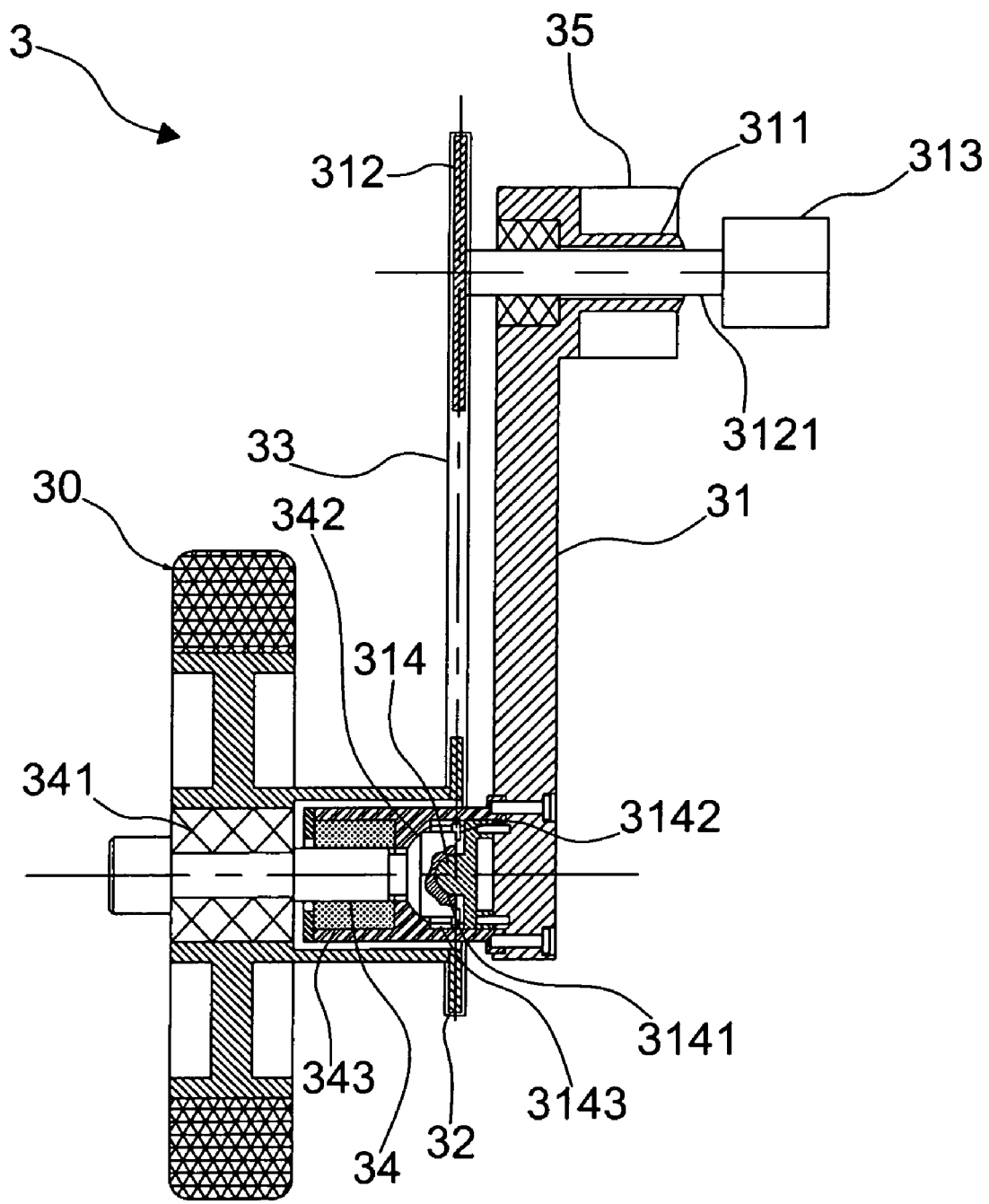
FIG. 3 is a view showing a second wheel set according to the preferred embodiment of the present invention.

Please refer to FIG. 1 through FIG. 3, which are a perspective view showing a preferred embodiment; and views showing a first and a second wheel sets of the preferred embodiment, according to the present invention. As shown in the figures, the present invention is an intelligent obstacle-overcoming vehicle, comprising a main body 1, a pair of first wheel sets 2 and a pair of second wheel sets 3.

The main body 1 comprises a base frame 11, a seat 12 and a linkage 13, where the linkage 13 links the base frame 11 and the seat 12. The seat 12 has a plurality of distance sensors 121. The distance sensor 121 senses a distance from a stair and a height to an adjacent stair after the present invention is turned straight in front of a stair; the distance sensor 121 judges whether the tire surfaces of the first wheel sets 2 and the second wheel sets 3 slide on the stair surfaces; and, the distance sensor 121 obtains accommodation parameters of stair sizes for the seat 12 to go up/down stairs. A controlling device 122 is deposed on a supporting arm of the seat 12 for a user to control the going forward or backward or upward or downward of the present invention. The main body 1 has a horizon sensor (not shown in the figures). And, the linkage 13 has a first motor, a servo motor (not shown in the figures), to control the gravity center of the seat 12 and further the gravity center of the whole present invention.

The first wheel set 2 is the front wheel of the main body 1, which is connected to the base frame 11 through the first rocker arm 21 by a first hollow shaft 211 at an end of the first rocker arm 21.

The first wheel set 2 has a first chain wheel 212, where a first spindle 2121 of the first chain wheel 212 penetrates through the first shaft 211 of the first rocker arm 21; and the first chain wheel 212 drives a third chain wheel 22 adhered with a first wheel 20 of the first wheel set 2.

The first shaft 211 of the first rocker arm 21 is connected with a third motor 26, a servo motor, to drive the first rocker arm 21 for obstacle-overcoming and pose-changing coordinated with a second shaft 311 of a second rocker arm 31.

The first wheel 20 is fixed at another end of the first rocker arm 21 and is connected to the first rocker arm 21 by using a first wheel axle 24 of the first wheel 20 through a first universal joint 214 of the first rocker arm 21; and, an inner spherical surface 2141 of the first universal joint 214 has the same center as that of an outer spherical surface 242. The rotation of the first universal joint 214 is limited by using a pair of first constraint pins 2142 and a pair of first constraint pin slots 2143 so that the first universal joint 214 is moved firmly following the first rocker arm 21 to avoid abrasion of idle rotating of the inner spherical surface 2141 and the outer spherical surface 242. Therein, centers of the first constraint pins 2142 and the first universal joint 214 are collinear. Accordingly, the first wheel 20 is connected with the first rocker arm 21, where the first wheel axle 24 of the first wheel 20 is connected with the first universal joint 214 of the first rocker arm 21 and the first wheel axle 24 is penetrated through the first bearing 241.

Besides, the first chain wheel 212, the third chain wheel 22 and the first universal joint 214 are collinear to avoid curve moment obtained by rotating the first chain wheel 212 and the third chain wheel 22. And a first rubber cushion 243 is deposed between the first universal joint 214 and the first wheel axle 24. The first wheel axle 24 has a pair of perpendicular pressure sensors. Since the first rubber cushion 243 absorbs shocks from the first wheel 20, the perpendicular pressure sensors detect the forces and the directions of the shocks, the user's weight and the gravity center of the whole, so that parameters for overcoming obstacles are obtained. In addition, the first wheel 20 comprises a plurality of lateral moving wheels 25 so that the first wheel 20 can move forward or move lateral for turning.

The second wheel set 3 is the rear wheel of the main body 1, which is connected to the base frame 11 through the second rocker arm 31 by the second hollow shaft 311 at an end of the second rocker arm 31.

The second wheel set 3 comprises a second chain wheel 312, where a second spindle 3121 of the second chain wheel 312 penetrates through the second shaft 311 of the second rocker arm 3; and, a fourth chain wheel 32 adhered with a second wheel 30 of the second wheel set 3.

The second shaft 311 of the second rocker arm 31 is connected with a fourth motor 35, a servo motor, to drive the second rocker arm 31 for obstacle-overcoming and pose-changing coordinated with the first shaft 211 of the first rocker arm 21.

The second wheel 30 is fixed at another end of the second rocker arm 31 and is connected to a second universal joint 314 of the second rocker arm 31 by using a second wheel axle 34 of the second wheel 30; and, an inner spherical surface 3141 of the second universal joint 314 has the same center as that of an outer spherical surface 342. The rotation of the second universal joint 314 is limited by using a pair of second constraint pins 3142 and a pair of second constraint pin slots 3143 so that the second universal joint 314 is moved firmly following the second rocker arm 31 to avoid abrasion of idle rotating of the inner spherical surface 3141 and the outer spherical surface 342. Therein, centers of the second constraint pins 3142 and the second universal joint 314 are collinear. Accordingly, the second wheel 30 is connected with the second rocker arm 31, where the second wheel axle 34 of the second wheel 30 is connected with the second universal joint 314 of the second rocker arm 31 and the second wheel axle 34 is penetrated through the second bearing 341.

Besides, the second chain wheel 312, the fourth chain wheel 32 and the second universal joint 314 are collinear to avoid curve moment obtained by rotating the second chain wheel 312 and the fourth chain wheel 32. And a second rubber cushion 343 is deposed between the second universal joint 314 and the second wheel axle 34. The second wheel axle 34 has a pair of perpendicular pressure sensors. Since the second rubber cushion 343 absorbs shocks from the second wheel 30, the perpendicular pressure sensors detect the forces and the directions of the shocks; the user's weight; and the gravity center of the whole, so that parameters for overcoming obstacles are obtained.

The second spindle 3121 of the second chain wheel 312 is then connected with a second motor 313, a servo motor, so that the second chain wheel 312 is driven to rotate; and then the fourth chain wheel 32 is driven to rotate by the second chain wheel 312; and, so, the first wheel 20 as well as the second wheel 30 are driven to rotate altogether. Yet the first spindle 2121 of the first chain wheel 212 is not connected with any servo motor but is capable of putting on the brakes.

As stated above, the present invention has seven degrees of freedom controlled by servo motors having brakes. After the first spindle 2121 and the second spindle 3121 put on the brakes for rocker arm to go up/down a stair while wheel faces are adhered to a surface of the stair, because the first chain wheel 212 and the second chain wheel 312 have the same diameter lengths, the wheel faces are stuck to the stair surface and is prevented from sliding when the rocker arm turns;. hence, problems regarding friction of the wheel faces are diminished and the steadiness for the going up/down stairs of the main body 1 is ensured. In the other hand, by inputting a number of rotations for forwarding or backwarding, a servo motor stops advancing after the number of rotations so that functions of positioning and braking are obtained. Therein, the servo motors comprise: (a) the first motor at the linkage 13; (b) the second motors 313 at the second spindles 3121 of the pair of second wheels 30; (c) the third servo motors 26 at the first shafts 211 of the pair of first rocker arms 21; and (d) the fourth servo motors 35 at the second shafts 311 of the pair of second rocker arms 31. In addition to the above degrees of freedom with seven servo motors having brakes, there are still two degrees of freedom at the first spindles 2121 of the first chain wheels 212 of the pair of first wheels 20, which have functions of brakes only.

Figure 4:
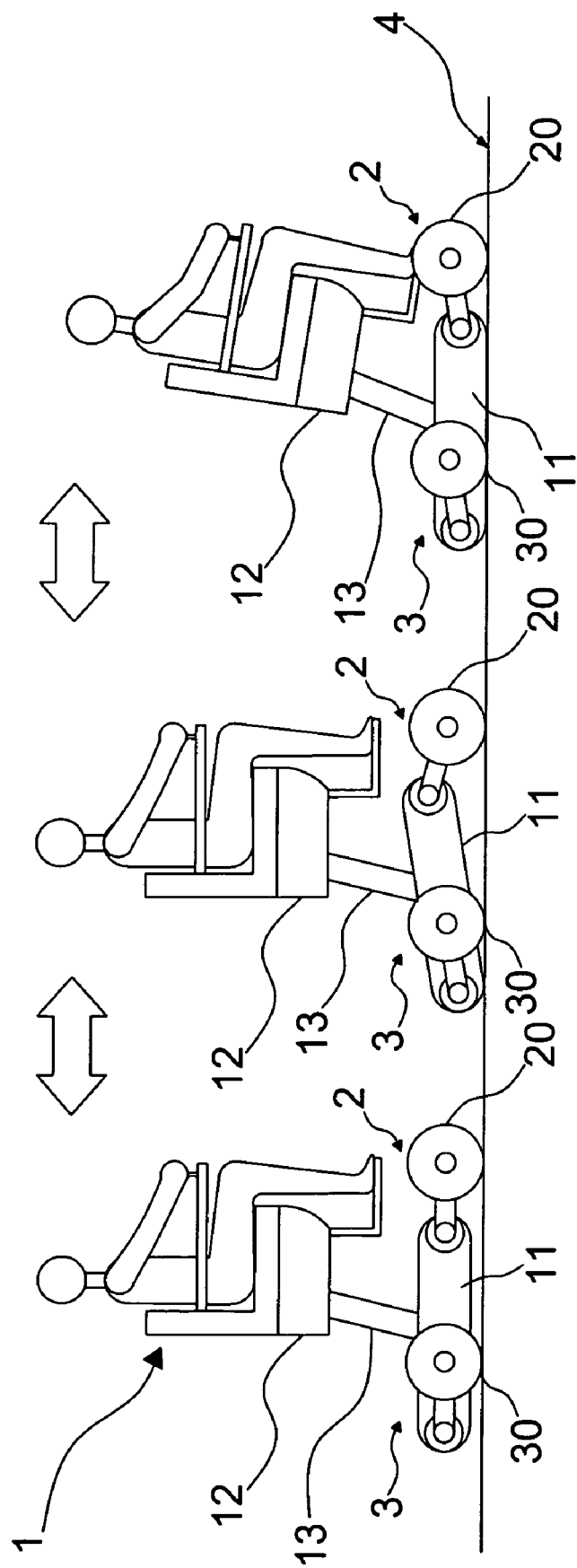
FIG. 4 is a view showing getting on/off the preferred embodiment according to the present invention.

Please refer to FIG. 4, which is a view showing getting on/off the preferred embodiment according to the present invention. As shown in the figure, when getting off the vehicle, a base frame 11 of a main body 1 is lowered to be completely in touch with the ground 4 and a seat 12 is tilted under the control of the linkage 13 so that a user can get off easily. At first, a front end of the base frame 11 is lifted up by a rocker arm of a first wheel set 2 and the seat 12 is tilted by the linkage 13; then a rear end of the base frame 11 is in touch with the ground 4 by using a rocker arm of a second wheel set 3; then, finally, the front end of the base frame 11 is lowered down to a height as high as the rear end. Therein, since the main body 1 has a horizon sensor (not shown in the figure), the lowering of the front end of the base frame 11 is stopped when the horizon sensor detects a same height of the front end as that of the rear end. On the other hand, regarding getting on the vehicle, it can be achieved by simply reversing the above steps.

Figure 5A:
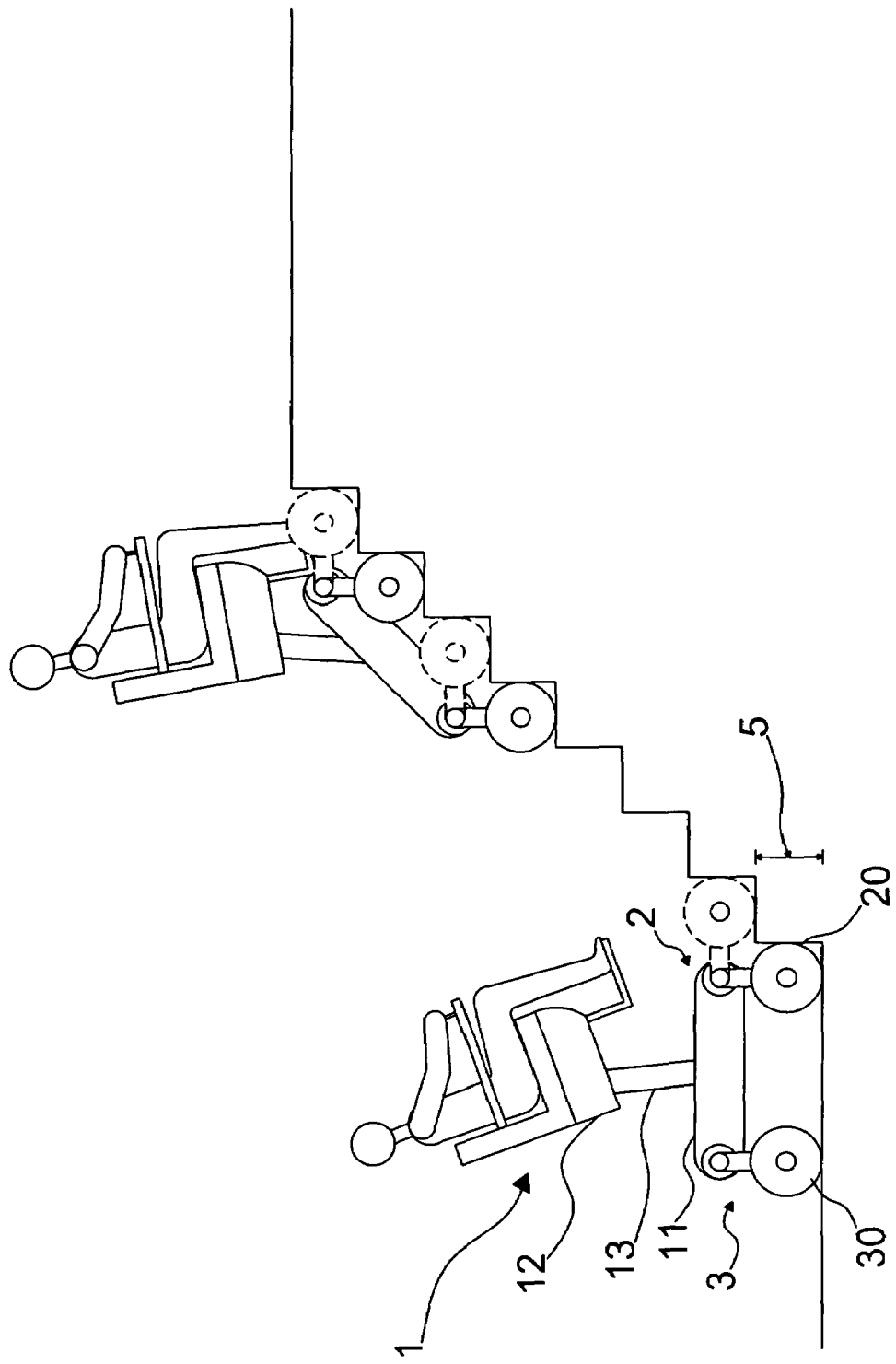
FIG. 5A is a view showing going up stairs according to the preferred embodiment of the present invention.

Please refer to FIG. 5A, which is a view showing going up stairs according to the preferred embodiment of the present invention As shown in the figure, when going up stairs, a main body 1 moves up by using a first and a second rocker arms 21, 31 of a first and a second wheel sets 2, 3 where a base frame 11 of the main body 1 is lifted to be higher then a stair height 5. Then, a gravity of a seat 12 is shifted backward under the control of a linkage 13 to start the going up stairs. During the going up stairs, the seat 12 is gradually moved forward by the linkage 13 to keep the whole balanced.

Figure 5B:
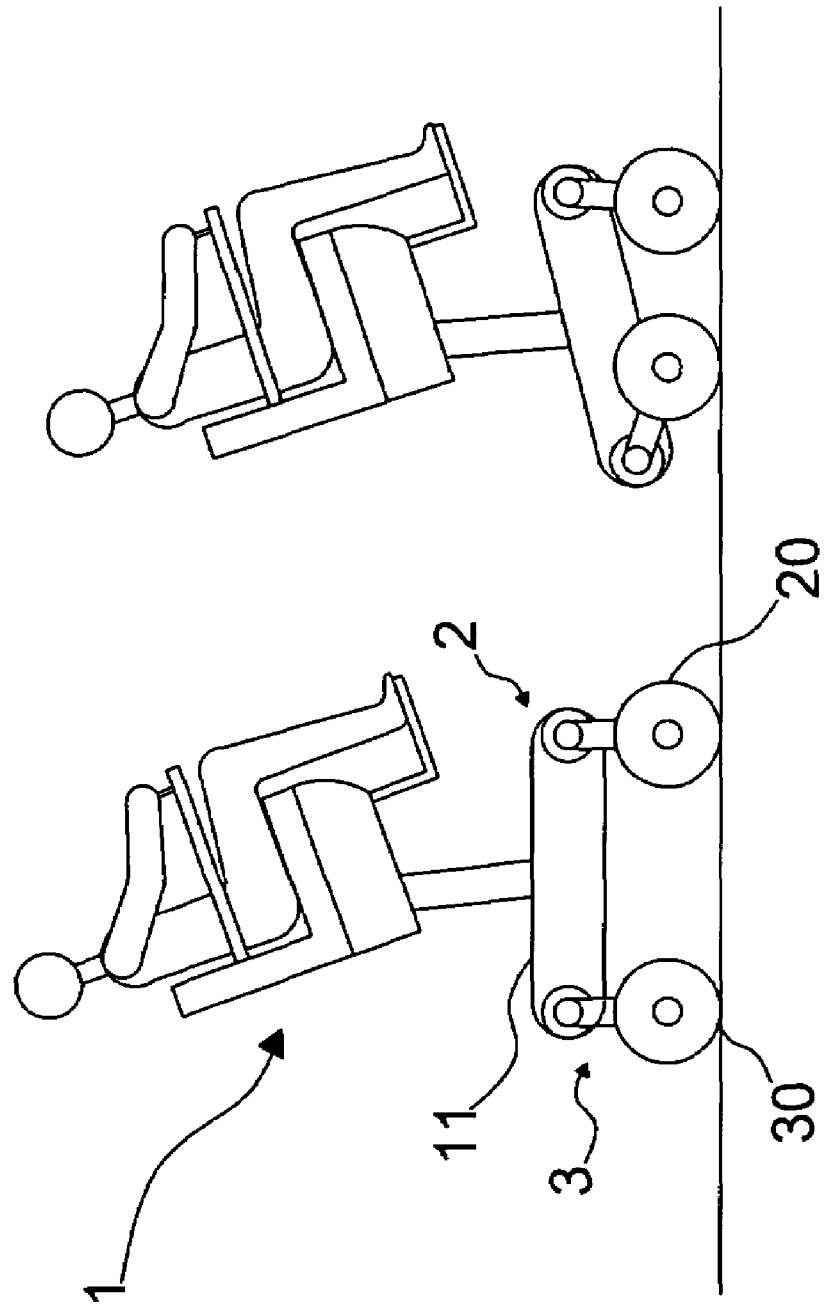
FIG. 5B is a view showing turning a direction on a stair according to the preferred embodiment of the present invention.
Figure 5C:
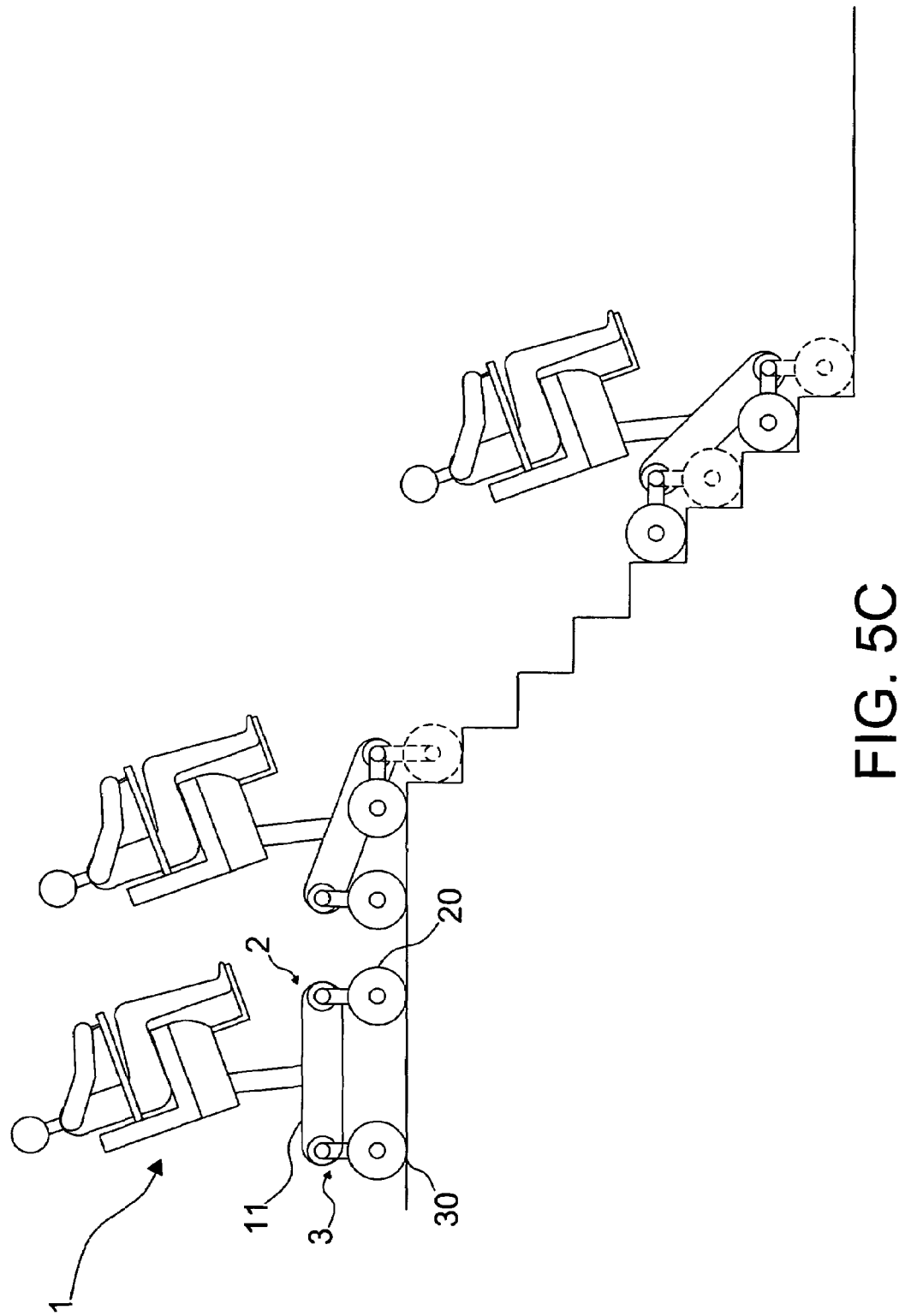
FIG. 5C is a view showing going down stairs according to the preferred embodiment of the present invention.

Please refer to FIG. 5B, which is a view showing turning a direction on a stair according to the preferred embodiment of the present invention. As shown in the figure, when stepping on a floor during going up stairs and planning to turn a direction, a rear end of a base frame 11 of a main body 1 is lowered by moving a second wheel 30 inward to the base frame 11. Since a turning radius becomes smaller by doing so, a gravity of the whole is concentrated backward. Then, by using the second wheel 30 as a turning support, a turning is done through using the lateral moving wheels (not shown in the figure) of the first wheel 20.

Figure 5D:
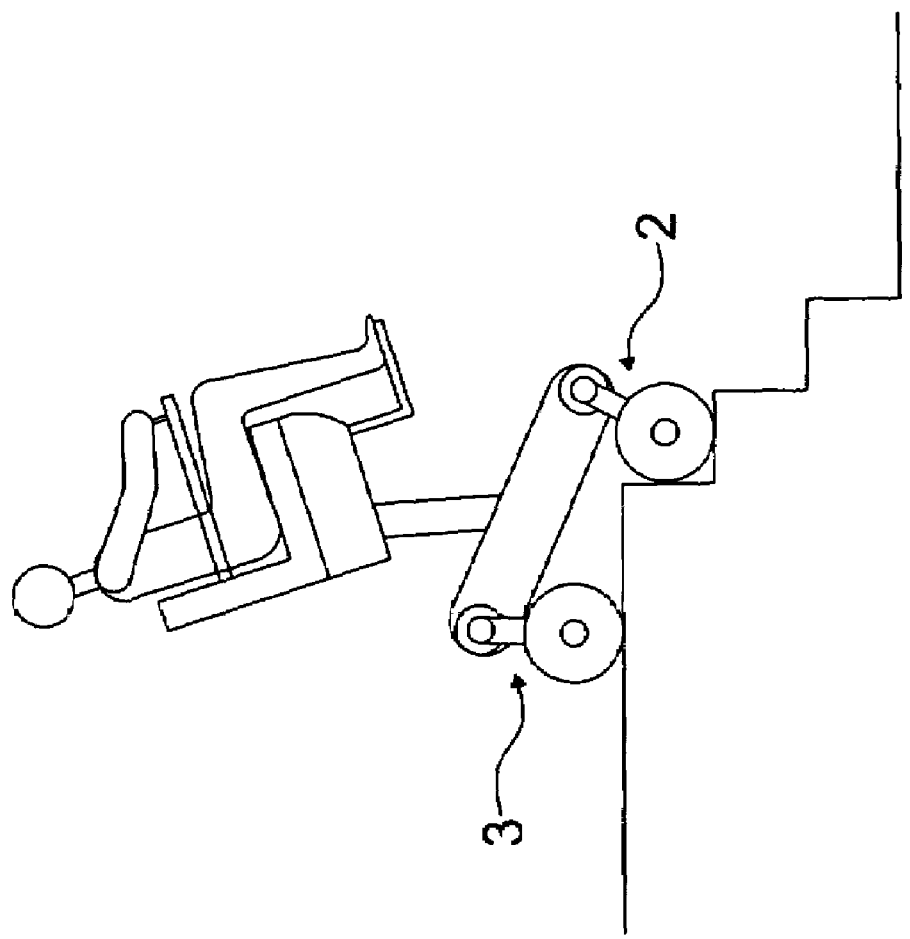
FIG. 5D is a view showing a first section of going down stairs according to the preferred embodiment of the present invention.
Figure 5F:
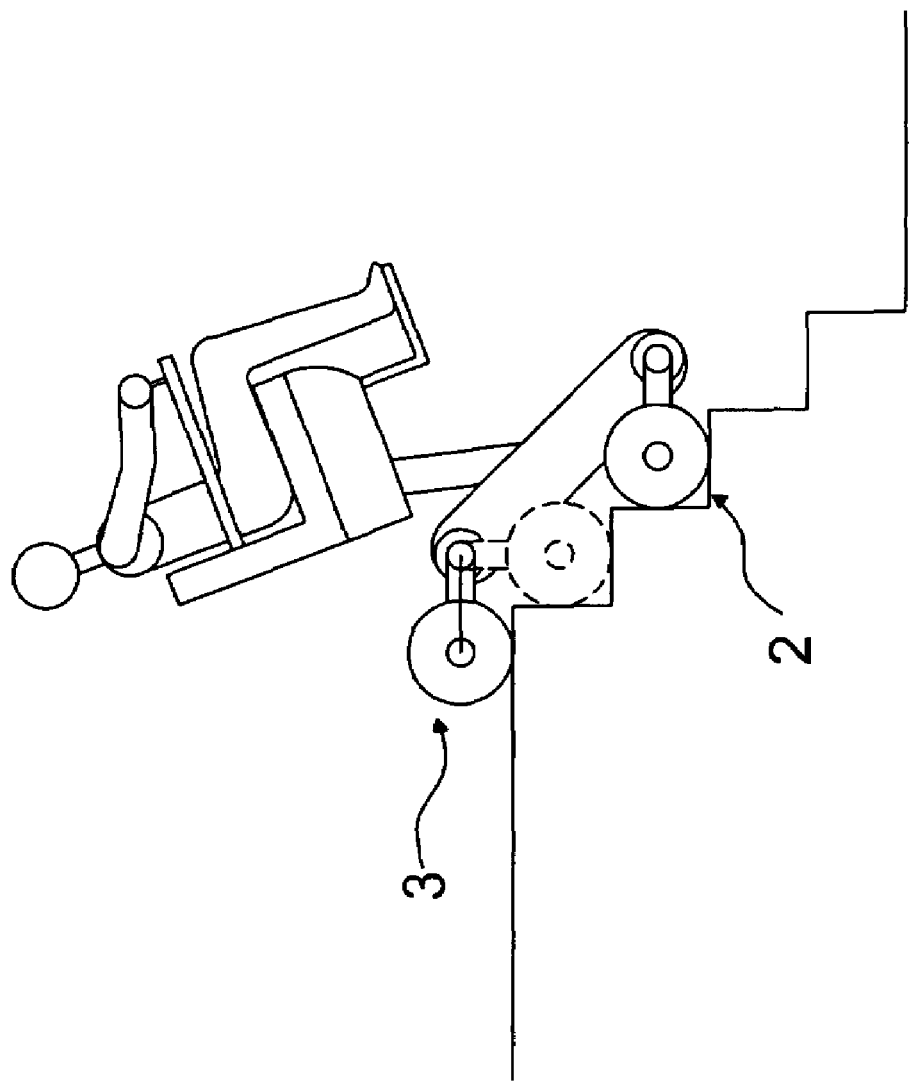
FIG. 5F is a view showing a third section of going down stairs according to the preferred embodiment of the present invention.
Figure 6:
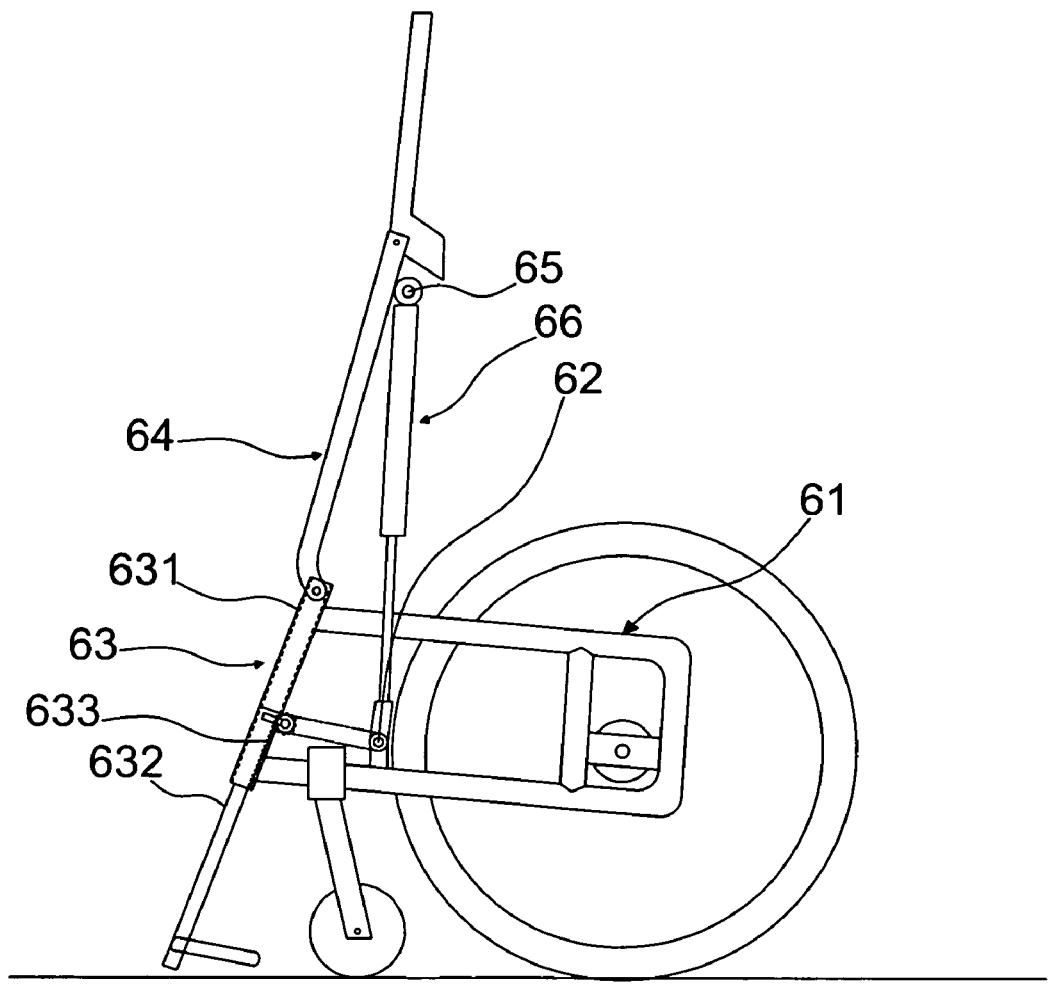
FIG. 6 is a structural view of the prior art.

Please refer to FIG. 5C through FIG. 5F, which are a view showing going down stairs and views showing a first, a second and a third sections of going down stairs, according to the preferred embodiment of the present invention. As shown in the figures, when going down stairs, a main body 1 is lifted up at first (shown in FIG. 5A); then a gravity of a seat 12 is adjusted by a linkage so that the gravity of the seat 12 is further concentrated backward to keep the whole balanced. The statuses of the first wheel set 2 and the second wheel set 3 during the first few steps of going down stairs are shown in FIG. 5D to FIG. 5F.

To sum up, the present invention is an intelligent obstacle-overcoming vehicle, where the disabled can go up stairs easily and can be lifted to a height as high as a normal person.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An intelligent obstacle-overcoming vehicle, comprising:
   (a) a main body, comprising a base frame, a seat and a linkage, said linkage linking said base frame and said seat, said linkage having a motor, said seat having a plurality of distance sensors and a controlling device;
   (b) a pair of first wheel sets, said first wheel set comprising a first wheel and a first rocker arm, said first wheel comprising a plurality of lateral moving wheels, said first rocker arm connecting said first wheel set and said base frame; and
   (c) a pair of second wheel sets, said second wheel set comprising a second wheel and a second rocker arm, said second rocker arm connecting said second wheel set and said base frame,
   wherein said first rocker arm has a first shaft at an end of said first rocker arm, wherein said first shaft connects said first rocker arm and said base frame, connects to a third motor, and is penetrated by a first spindle of a first chain wheel;
   and wherein said first rocker arm has a first universal joint at another end of said first rocker arm to connect to said first wheel and a third chain wheel adhering to said first wheel.

2. The vehicle according to claim 1, wherein said main body further comprises a horizon sensor.

3. The vehicle according to claim 1, wherein said controlling device is deposed on a supporting arm of said seat.

4. The vehicle according to claim 1, wherein said first motor is a servo motor.

5. The vehicle according to claim 1, wherein said third motor is a servo motor.

6. The vehicle according to claim 1, wherein a first chain connects said first chain wheel and said third chain wheel; and wherein centers of said first chain wheel, said third chain wheel and said first universal joint are collinear.

7. The vehicle according to claim 1, wherein a first rubber cushion is located between said first universal joint and a wheel axle of said first wheel; and wherein said first rubber cushion contains a pair of perpendicular pressure sensors.

8. The vehicle according to claim 1, wherein said first universal joint has a pair of first constraint pins; and wherein centers of said pair of first constraint pins and said first universal joint are collinear.

9. An intelligent obstacle-overcoming vehicle, comprising:
   (a) a main body, comprising a base frame, a seat and a linkage, said linkage linking said base frame and said seat, said linkage having a motor, said seat having a plurality of distance sensors and a controlling device;
   (b) a pair of first wheel sets, said first wheel set comprising a first wheel and a first rocker arm, said first wheel comprising a plurality of lateral moving wheels, said first rocker arm connecting said first wheel set and said base frame; and
   (c) a pair of second wheel sets, said second wheel set comprising a second wheel and a second rocker arm, said second rocker arm connecting said second wheel set and said base frame,
   wherein said second rocker arm has a second shaft at an end of said second rocker arm; wherein said second shaft connects said second rocker arm and said base frame, connects to a fourth motor, and is penetrated by a second spindle of a second chain wheel; wherein said second spindle connects to a second motor; and wherein said second rocker arm has a second universal joint at another end of said second rocker arm to connect to said second wheel and fourth chain wheel adhering to said second wheel.

10. The vehicle according to claim 8, wherein said second motor and said fourth motor are servo motors.

11. The vehicle according to claim 8, wherein a second chain connects said second chain wheel and said fourth chain wheel; and wherein centers of said second chain wheel, said fourth chain wheel and said second universal joint are collinear.

12. The vehicle according to claim 8, wherein a second rubber cushion is located between said second universal joint and a wheel axle of said second wheel; and wherein said second rubber cushion contains a pair of perpendicular pressure sensors.

13. The vehicle according to claim 8, wherein said second universal joint has a pair of second constraint pins; and wherein centers of said pair of second constraint pins and said second universal joint are collinear.

\* \* \* \* \*